United States Patent
Lee et al.

(10) Patent No.: US 8,492,297 B2
(45) Date of Patent: Jul. 23, 2013

(54) SILICA SODA LIME GLASS COMPOSITION AND USE THEREOF

(75) Inventors: Jun-Young Lee, Yusungogu (KR); Sei-Woong Yoo, Goyang-si (KR); Doo-Sang Ko, Gunsan-si (KR); Marc Maurer, Saint Jean Aux Bois (FR)

(73) Assignee: SAGE Electrochromics, Inc., Faribault, MN (US)

( * ) Notice: Subject to any disclaimer, the term of this patent is extended or adjusted under 35 U.S.C. 154(b) by 0 days.

(21) Appl. No.: 12/872,153

(22) Filed: Aug. 31, 2010

(65) Prior Publication Data

US 2012/0053044 A1    Mar. 1, 2012

Related U.S. Application Data

(60) Provisional application No. 61/376,746, filed on Aug. 25, 2010.

(51) Int. Cl.
*C03C 3/078* (2006.01)
*C03C 3/085* (2006.01)
*H01L 31/00* (2006.01)
*B32B 17/06* (2006.01)

(52) U.S. Cl.
USPC ............... 501/70; 501/65; 501/67; 501/69; 501/72; 136/260; 359/265; 359/273

(58) Field of Classification Search
USPC ........... 501/70, 72, 260, 65, 67, 69; 359/265, 359/273; 136/260
See application file for complete search history.

(56) References Cited

U.S. PATENT DOCUMENTS

| | | | | |
|---|---|---|---|---|
| 6,063,718 | A  * | 5/2000 | El Khiati et al. | 501/70 |
| 6,464,692 | B1 * | 10/2002 | Ruiz et al. | 606/5 |
| 2010/0300535 | A1 * | 12/2010 | Aitken et al. | 136/260 |
| 2010/0300536 | A1 * | 12/2010 | Aitken et al. | 136/260 |
| 2011/0017297 | A1 * | 1/2011 | Aitken et al. | 136/260 |

FOREIGN PATENT DOCUMENTS

| | | | |
|---|---|---|---|
| JP | 2008280189 | * | 11/2008 |
| JP | 2009215165 | * | 9/2009 |
| KR | 10-2010-0080436 | | 7/2010 |

* cited by examiner

*Primary Examiner* — Karl Group
(74) *Attorney, Agent, or Firm* — Lerner, David, Littenberg, Krumholz & Mentlik, LLP

(57) ABSTRACT

A device including a glass substrate made of a soda lime silica glass composition of: $SiO_2$ (50~75 wt %); $Na_2O$ (1~8 wt %); $K_2O$ (1~12 wt %); CaO (1~12 wt %); $ZrO_2$ (0~8 wt %); SrO (0~15 wt %); BaO (0~12 wt %); MgO (0~10 wt %); $Al_2O_3$ (0~12 wt %); $B_2O_3$ (0~3 wt %), wherein the total amount of $Na_2O$ and $K_2O$ is in the range of 5~15 wt %, the total amount of CaO, MgO, SrO and BaO is in the range of 10~25 wt %.

8 Claims, No Drawings

SILICA SODA LIME GLASS COMPOSITION AND USE THEREOF

TECHNICAL FIELD

The present invention relates to a soda lime silica glass composition which has a high strain point and a resistance against alkali diffusion, and its use in devices such as a solar cell and an electrochromic device.

BACKGROUND ART

In recent years, the demand for a clean energy increases due to an environmental pollution and a fossil energy exhaustion. In particular, development for a solar cell, which does not cause environment pollution and is a limitless energy supply source, is widely and intensively performed.

Depending on the material of a light absorption layer, the solar cell might be classified into an inorganic solar cell formed of an inorganic material such as silicon or a multinary compound semiconductor, a dye-sensitized solar cell principally formed of an organic material, and an organic solar cell. The solar cell made of crystalline silicon occupies more than 90% in a market share of solar cells. However the manufacture unit cost increases in recent years due to a demand and supply problem in a silicon material, so a power generation costs more as compared to other recycling energy. Therefore the demand for the development of a thin film solar cell, which might be manufactured in a thin film type on a cheap substrate like a glass, a metal, and a plastic instead of an expensive silicon substrate, is urgently needed.

The above thin film solar cell generally uses a substrate made of a cheap flat glass, namely, a soda lime glass. On the soda lime glass substrate, a light absorption layer including amorphous silicon, a multinary compound semiconductor like a CdTe or CIS compound, namely, I-III-VI$_2$ group chalcopyrite is stacked.

In the thin film solar cells, the CIS thin film solar cell, which uses I-III-VI$_2$ group chalcopyrite compound semiconductor as a light absorption layer, has a higher light absorption coefficient and higher energy conversion efficiency, so it is being intensively studied in views of a low cost and a high efficiency.

The CIS compound thin film solar cell is made in a structure that a glass substrate, a metallic electrode layer, a CIS light absorption layer, a high resistance buffer layer, a thin film layer of a transparent electrode, and a reflection prevention layer are stacked in order. When a light absorption layer is stacked on a metallic electrode layer, it is heated up to above 500° C. Alkali components from a soda lime glass, which is used as a substrate, pass through a metallic electrode layer during a heat treatment process and are diffused into a light absorption layer. The migration of a proper amount of alkali components helps increasing an electric charge concentration of a thin film or decreasing a structural characteristic change based on a composition change thereby enhancing the efficiency of a thin film solar cell. That is to say there needs two parameters to achieve an economically benefit and competitive energy conversion efficiency in manufacturing CIS compounds solar cell. They are a high processing temperature more than 500° C. and proper alkali contents.

The strain point of a normal soda lime silicate glass is around 500° C., so a processing temperature of 500° C. is realistically not possible in a mass production line which should use big size glass substrate because it can not guarantee a size stability and safety.

However, when it is over migrated, a light absorption layer might be peeled from an interface of a metallic electrode layer. Since alkali is non-uniformly distributed in a light absorption layer, the efficiency might be worsened, and the lifespan is shortened. The above problems might more increase at a process temperature of above 500° C., so increasing the process temperature is limited.

According to the international application WO 2006/062206, a cheap soda lime glass substrate is used so as to form a CIS thin film solar cell. An alkali diffusion protecting layer of such as oxide or nitride is stacked between a glass substrate and a metallic electrode layer. However, the above method needs an additional process for forming an alkali diffusion protecting layer, and it is needed to coat a Na-contained layer for an alkali supply in order to obtain a high efficiency of a solar cell. Namely, two more processes are additionally needed, which leads to increasing the price of a solar cell. Moreover, as mentioned high processing temperature which is necessary for high conversion efficiency will be restricted when use a normal soda lime silicate glass.

According to the U.S. Pat. No. 6,680,266, it discloses an alumino borosilicate glass which has a low alkali or does not have alkali which might be used in a substrate of a solar cell. The alumino borosilicate glass contains B$_2$O$_3$, so it can effectively prevent a heat spreading of alkali, which is possible to happen in a normal soda lime silicate glass substrate, since it has a high heat resistance performance and does not have an alkali metallic component. However it can not be prepared through the float process which is suitable for a mass production, so the unit cost for its manufacture increases. Furthermore, an alkali doping or Na-contained coating might be further needed for supplying Na which is needed so as to manufacture a high efficiency solar cell. A various kinds of method for an alkali doping or Na-contained coating were invented and applied, but the efficiency results have not reach to the results from a normal soda lime silicate glass substrate.

Meanwhile, the electrochromic device uses an electrochromic phenomenon that change colors by means of electric field and is applied to a window such as a smart window, glasses, a mirror and a display etc. The electrochromic device is manufactured as a transparent electrode layer is formed by stacking ITO or another material on a glass substrate, and an electrochromic layer (WxOy, MoxOy, etc), which is a reduction coloring substance, an electrolyte layer, a counter electrode layer (VxOy, NixOy or another material) are stacked on the same. A cheap soda lime glass substrate can be used as a glass substrate of the above electrochromic layer. When a surplus alkali is spread to ITO in the soda lime glass substrate, the transparent electrode layer might be degraded, and the performance of the electrochromic device might decrease.

A glass substrate having a thermal stability to tolerate a heating process of 500° C.~520° C. or even 600° C. is needed so as to manufacture a thin film solar cell or an electrochromic device which has a good quality, a high operation performance and a high reproduction performance. The glass substrate further needs a function for preventing or controlling an over spreading of alkali components. At the same time the glass substrate needs a property of supplying a proper alkali content enough to be resulted in high energy conversion efficiency in CIS compounds thin film solar cell.

SUMMARY

An object of a preferred embodiment of the present invention is to provide a glass composition suitable for a substrate of a solar cell and an electrochromic device which can be produced at a mass production by the float process and has a thermal stability at a high temperature which prevent an over migration of alkali components without an additional alkali spreading prevention film.

DETAILED DESCRIPTION

To this end, one embodiment of the present invention provides an electrochromic device comprising a glass substrate made of a soda lime silica glass composition of following composition:

| | |
|---|---|
| $SiO_2$ | 50~75 wt % |
| $Na_2O$ | 1~8 wt % |
| $K_2O$ | 1~12 wt % |
| CaO | 1~12 wt % |
| $ZrO_2$ | 0~8 wt % |
| SrO | 0~15 wt % |
| BaO | 0~12 wt % |
| MgO | 0~10 wt % |
| $Al_2O_3$ | 0~12 wt % |
| $B_2O_3$ | 0~3 wt %, | wherein the total amount of $Na_2O$ and $K_2O$ is in the range of 5~15 wt %, the total amount of CaO, MgO, SrO and BaO is in the range of 10~25 wt %.

Preferably, the soda lime silica glass composition can have a high strain-point over 570° C. and/or a thermal expansion coefficient of 60-85×10$^{-7}$/° C.

The present invention provides a glass substrate of the soda lime silica glass composition for devices such as a solar cell and an electrochromic device.

According to a preferred embodiment of the present invention, the glass substrate for a solar cell is used for a thin layer solar cell, more preferably for a CIS thin layer solar cell.

The present invention can provide a solar cell and an electrochromic device comprising the glass substrate of the present invention.

The present invention will be illustrated below by concrete exemplary embodiments, to which however the invention is not limited.

The glass composition according to a preferred embodiment can have a good thermal stability, which allows high temperature process over 500° C. to manufacture a high-efficient solar cell and/or electrochromic device. The glass composition can have an excellent resistance against alkali diffusion, which controls an excess migration of alkali component by heat that it is possible to prevent the degradation of the devices without an additional alkali diffusion protecting layer. The soda lime silica glass composition can be manufactured in a float method, which is a mass glass production method, so a manufacturing cost decreases.

The soda lime silica glass composition according to a preferred embodiment of the present invention has the following compositions and a high strain-point and an resistance against alkali diffusion:

| | |
|---|---|
| $SiO_2$ | 50~75 wt % |
| $Na_2O$ | 1~8 wt % |
| $K_2O$ | 1~12 wt % |
| CaO | 1~12 wt % |
| $ZrO_2$ | 0~8 wt % |
| SrO | 0~15 wt % |
| BaO | 0~12 wt % |
| MgO | 0~10 wt % |
| $Al_2O_3$ | 0~12 wt % |
| $B_2O_3$ | 0~3 wt %, | wherein the total amount of $Na_2O$ and $K_2O$ is in the range of 5~15 wt %, the total amount of CaO, MgO, SrO and BaO is in the range of 10~25 wt %.

The silica ($SiO_2$) of the glass composition is a necessary element in the glass industry. When the amount of silica is too small, the strain-point temperature decreases and thereby a thermal and chemical stability of glass decreases. The strain-point temperature is corresponding to the temperature when the viscosity of glass is $10^{14.5}$ poises. When the amount is too large, the viscosity is too large, so a melting and molding of glass is impossible. The amount of silica is preferably of at least 53%, or 55% and/or at most 70%.

In the above glass composition, $Na_2O$ and $K_2O$ enable a melting and molding process in a common float process by adjusting a high temperature viscosity of glass. In particular, the above composition has an enhanced chemical stability due to a mixed alkali effect as the compositions of $Na_2O$ and $K_2O$ reside at similar ratios as compared to a conventional flat glass composition.

Accordingly, there is no deformation in a glass substrate even at a process temperature above 500° C. As a proper amount of alkali needed for a manufacture of a high efficiency CIS solar cell is supplied, energy deformation efficiency can be increased. The above glass composition suppresses alkali migration such that it is able to inhibit the excessive or non-homogeneous spreading of alkali components toward a light absorption layer of a solar cell or a transparent electrode layer of an electrochromic device with no additional alkali spreading prevention layer, possibilities of decreasing of efficiency and/or life span thereby are reduced.

Moreover, when manufacturing CIS compound thin film solar cell with alkali barrier layer, there is a high risk of de-lamination of layers between metal electrode and CIS layer caused by Na doping or Na-contained coating existing between those layers. The above glass composition does not present such a high risk. Even when it uses an additional alkali doping or Na-contained coating layer for manufacturing a high efficient CIS compound thin film solar cell, it needs only a small amount of alkali contents, thereby the risk of de-lamination is very low.

CaO and MgO increase the whole strain point of glass. SrO might be further used for enhancing a thermal and chemical stability of glass. It is preferred that the total amounts of alkali earth oxides of CaO, MgO, SrO and BaO according to a preferred embodiment of the present invention are 10~24%, even 15~24%.

Preferably, the glass composition according to the present invention contains $Al_2O_3$ (and optionally $ZrO_2$) as a stabilizer, which increases a chemical stability and strain point of a glass composition according to the present invention. $Al_2O_3$ should be used below 12% in weight % so that a high temperature should not be over increased, and it is preferred that $ZrO_2$ is used below 8% for an easier melting.

The total amount of $SiO_2$ and $Al_2O_3$ is preferably 60-70%, even 60-65%.

The glass composition according to the present invention preferably includes $B_2O_3$, and $B_2O_3$ helps increasing a chemical durability of the glass composition.

The glass composition according to the present invention preferably has a strain point of at least 570° C., 580° C. Accordingly, the glass composition according to the present invention is stabilized at a high temperature, so the substrate has a less deformation by means of heat when a solar cell or an electrochromic device is manufactured. Since a thermal expansion coefficient is smaller as compared to a common flat glass, it is possible to inhibit a deformation problem due to a contraction of a glass substrate which might occur during a high temperature process and a cooling process.

In the manufacture of a CIS solar cell, it is reported that as the process temperature of a light absorption layer is higher, higher energy conversion efficiency can be obtained (C. A. Kaufmann, et al. Depth profiling of CIGS thin films grown at low temperatures, Technical digest of the International PVSEC-17, Fukuoka, Japan, 2007). In that respect, the glass composition according to the present invention has an excellent thermal stability since it has a strain point of above 570° C. as compared to a conventional flat glass which has a low strain point of 500~510° C., so it is possible to increase a process temperature as compared to a conventional soda lime glass, whereby a glass substrate, which can be more stably applied to a thin film solar cell having an enhanced energy conversion efficiency, in more details, a silicon thin film solar cell, a CdTe thin film solar cell or a CIS compound thin film solar cell, more preferably, a CIS thin film solar cell.

When the glass composition according to the present invention has preferably a lower thermal expansion coefficient of $60$-$85 \times 10^7/°$ C., it has a better adaptation to other elements of a solar cell or an electrochromic device, for example, a Mo metallic electrode layer which forms a CIS solar cell, a light absorption layer or a transparent electrode layer of an electrochromic device. The thermal stress occurring when temperature is quickly changed might be computed as follows.

$$\sigma th = \alpha E \Delta T/(1-\epsilon)$$

σth=thermal stress
E=Young modulus
ΔT=Temperature deviation
ε=Poisson ratio

When σth value is above the breaking stress of glass, since the glass is broken, the value is substituted with a breaking stress (σf) of the glass, so the thermal resistance temperature difference ΔTmax can be computed as follows.

$$\Delta T max = \sigma f(1-\epsilon)/\alpha E$$

Since the change of E or ε due to a glass composition is small, what most affects ΔTmax is α, namely, thermal expansion coefficient. Finally, as the value of α is smaller, the thermal resistance temperature difference increases, so the glass composition of the present invention has a strong resistance to a thermal impact.

Since the glass composition according to the present invention is based on a common soda lime silica glass formed of $SiO_2$—$CaO$—$Na_2O$, the material is cheaper as compared to an expensive no-alkali glass of the prior art (U.S. Pat. No. 6,680,266B) for the use in a CIS compound thin film cell, and a mass production is possible with the help of a float process, so that the present invention is more economical.

The glass substrate according to the present invention can be well applied to manufacturing a solar cell, more preferably, a thin film solar cell or a CIS thin film solar cell which uses, as a light absorption material, a multinary compound semiconductor like a I-III-VI2 group Chalcopyrite for example $CuInSe_2$, $CuInGaSe_2$, $CuGaSe_2$, $Cu(InGa)(SSe)_2$, $CuInS_2$, $CuGaS_2$, $CuInGaS_2$, etc.

In addition, the present invention provides a solar cell which uses the substrate based on the glass composition according to present invention. The solar cell according to the present invention is formed by stacking a device suitable for a solar cell on the glass substrate in a method known in the field.

For example, in the case of a CIS thin film solar cell, a metallic electrode layer formed of Mo is stacked on the soda lime glass substrate according to present invention, and a compound semiconductor such as $CuInSe_2$ and $CuInGaSe_2$ is stacked thereon for thereby forming a p-type CIS light absorption layer, and a high resistance buffer layer, and a n-type transparent electrode layer are stacked in order.

The solar cell including the glass substrate, in particular a CIS thin film solar cell, according to the present invention can be manufactured with a simple process since an additional alkali spreading prevention layer is not needed.

The present invention provides an electrochromic device which uses a glass substrate according to the present invention. In the electrochromic device according to the present invention, a transparent electrode layer such as an ITO is formed on a soda lime silica glass substrate, and an electrochromic device layer (WxOy, MoxY, etc), which is a reduction coloring substance, an electrolyte layer, and a relative electrode layer (VxOy, NixOy, etc) are stacked on the same by a known method. The electrochromic device, which uses the glass substrate according to the present invention, is able to prevent a degradation of a transparent electrode layer by diffusion of alkali from a glass substrate to a transparent electrode layer such as ITO.

The invention claimed is:
1. An electrochromic device comprising a glass substrate made of a soda lime silica glass composition of following composition:

| | |
|---|---|
| $SiO_2$ | 55~75 wt % |
| $Na_2O$ | 1~8 wt % |
| $K_2O$ | 1~9 wt % |
| CaO | 7~12 wt % |
| $ZrO_2$ | 1~8 wt % |
| SrO | 3~9 wt % |
| BaO | 0~12 wt % |
| MgO | 0~5 wt % |
| $Al_2O_3$ | 0~7 wt % |
| $B_2O_3$ | 0~3 wt %, | wherein the total amount of $Na_2O$ and $K_2O$ is in the range of 5~12 wt %, the total amount of CaO, MgO and SrO is in the range of 10~24 wt %, wherein the glass substrate has a strain-point over 570° C. and wherein the glass substrate has a thermal expansion coefficient of $60$-$85 \times 10^{-7}/°$ C.

2. The electrochromic device according to claim 1, wherein the glass substrate has a thermal expansion coefficient of $65$-$80 \times 10^{-7}/°$ C.

3. The electrochromic device according to claim 1, wherein the total amount of $SiO_2$ and $Al_2O_3$ is 60-70%.

4. The electrochromic device according to claim 1, wherein the total amount of CaO, MgO, SrO and BaO is 15~24%.

5. The electrochromic device of claim 1, wherein said device further comprises a first transparent electrode adjacent to said glass substrate, an electrochromic layer adjacent to said transparent electrode, an electrolyte adjacent to said electrochromic layer, a counter electrode adjacent to said electrolyte, and a second transparent electrode adjacent to said counter electrode.

6. An electrochromic device comprising a glass substrate made of a soda lime silica glass composition of following composition:

| | |
|---|---|
| $SiO_2$ | 55~70 wt % |
| $Na_2O$ | 1~8 wt % |
| $K_2O$ | 1~9 wt % |

-continued

| | |
|---|---|
| CaO | 7~12 wt % |
| ZrO$_2$ | 1~8 wt % |
| SrO | 3~9 wt % |
| BaO | 0~12 wt % |
| MgO | 0~5 wt % |
| Al$_2$O$_3$ | 0~7 wt % |
| B$_2$O$_3$ | 0~3 wt %, | wherein the total amount of Na$_2$O and K$_2$O is in the range of 5~12 wt %, the total amount of CaO, MgO and SrO is in the range of 10~24 wt %, the total amount of SiO$_2$ and Al$_2$O$_3$ is in the range 60-70%; and wherein the glass substrate has a strain-point over 570° C.

7. The electrochromic device of claim 6, wherein the total amount of CaO, MgO, SrO and BaO is 15~24%.

8. The electrochromic device of claim 6, wherein said device further comprises a first transparent electrode adjacent to said glass substrate, an electrochromic layer adjacent to said transparent electrode, an electrolyte adjacent to said electrochromic layer, a counter electrode adjacent to said electrolyte, and a second transparent electrode adjacent to said counter electrode.

* * * * *